Sept. 2, 1952     B. C. COONS     2,608,973
PEA HARVESTING AND THRESHING MACHINE
Filed Sept. 20, 1947     5 Sheets-Sheet 3

INVENTOR
BURTON C. COONS
ATTORNEYS

Sept. 2, 1952     B. C. COONS     2,608,973
PEA HARVESTING AND THRESHING MACHINE
Filed Sept. 20, 1947     5 Sheets-Sheet 4
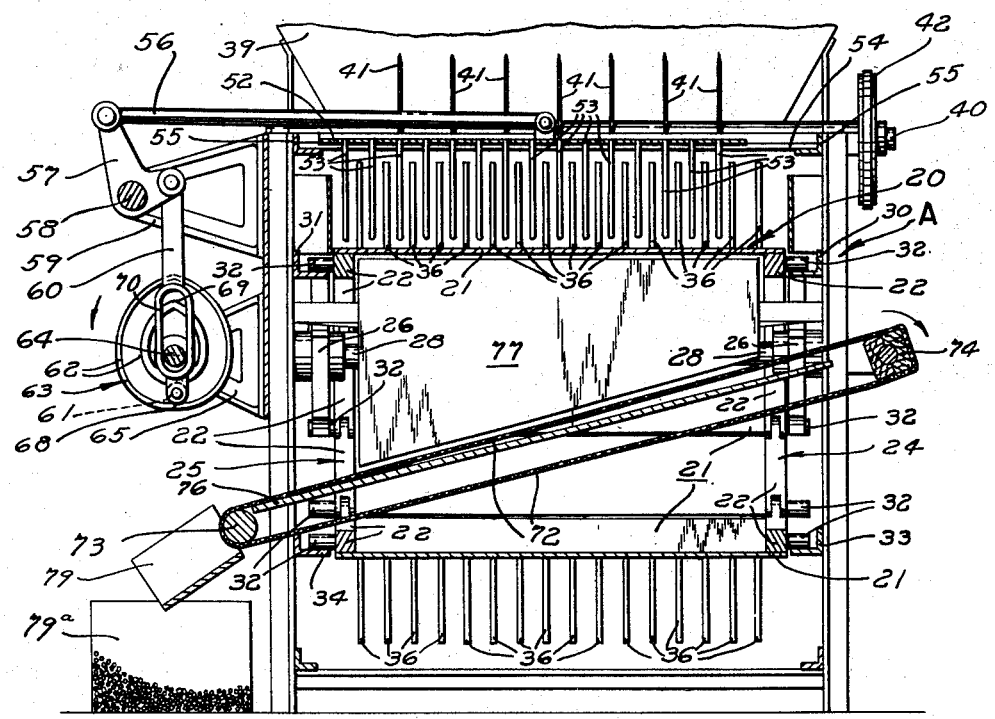
FIG_4
FIG_6
FIG_5
INVENTOR
BURTON C. COONS
BY Philip A. Minnis
Hans G. Hoffmeister
ATTORNEYS

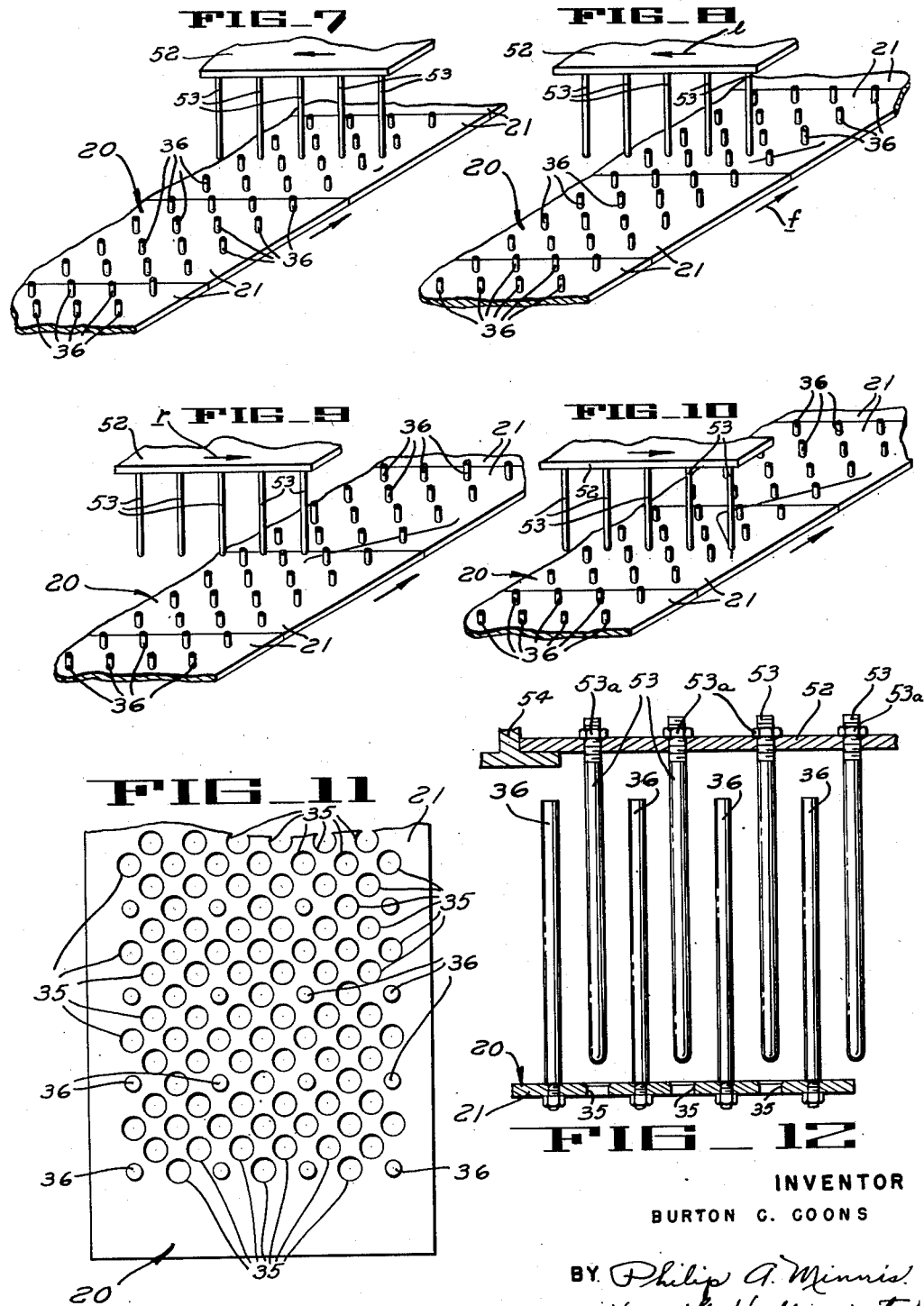

Patented Sept. 2, 1952

2,608,973

UNITED STATES PATENT OFFICE 2,608,973

PEA HARVESTING AND THRESHING MACHINE

Burton C. Coons, San Jose, Calif., assignor to Food Machinery and Chemical Corporation, a corporation of Delaware Application September 20, 1947, Serial No. 775,178

7 Claims. (Cl. 130—30)

The present invention relates to mechanisms for shelling green peas, beans, or other legumes. It is particularly applicable to legume-shelling mechanism of the type adapted to form part of a mobile harvesting machine. Such machines combine shelling mechanisms with automatic cutting devices for cutting the vines in the fields and with elevators for delivering the cut vines to the shelling mechanism proper where they are processed to recover the pea berries while the machine traverses the field.

Mechanical methods of harvesting legumes are confronted with many vexing problems. Thus, the period during which green peas are of an appropriate degree of maturity for canning purposes is rather short and frequently only a matter of days. During this time enormous quantities of peas must be harvested, shelled, and canned in a certain area, or they will become too ripe for preservation in cans. It is, therefore, of paramount importance that pea-shelling machines are capable of handling large quantities of the legumes in a continuous process, otherwise a great portion of the crop may ripen into a produce of a materially lower selling price, or the number of machines required to service a certain area may be so great and may account to so large an unproductive investment for the remainder of the year as to render the cost of harvesting the peas unprofitably high.

To get the peas from the field into the containers within the shortest possible time and thus increase the capacity of the harvesting apparatus, machines have, therefore, been devised to shell the peas without first separating the pods from the vines. However, the known methods of harvesting peas in this manner cause considerable amounts of the juices squeezed from the vines to contaminate the peas, which materially impairs the taste and hence the quality of the canned product.

Another serious problem in harvesting legumes is presented by the fact that green peas are of a very delicate nature and may easily be bruised or crushed during mechanical shelling operations. For canning purposes, however, they must be kept as free from abrasions and bruises as possible since the condition of the individual peas is a direct measure of the quality of the canned produce. Damaged peas are subject to enzymic deterioration and bacteriological decomposition.

Unfortunately, many of the known methods of mechanically shelling peas are of such a nature that the problem of preserving the pea berries intact stands in direct opposition to the problem of handling capacity. Thus, in machines of the impact type, wherein the filled pea pods are cracked open by the impact of rotating beaters, any increase in the operational speed of the beaters for the purpose of raising the capacity of the machine is accompanied by a pronounced increase in the number of bruised or otherwise damaged peas with all the harmful consequences above described.

Another problem, which is oppositely related to the problem of protecting the pea berries from injury, is the problem of waste. If pea-shelling machinery is operated with sufficient caution to avoid injury to the pea berries, this does not only reduce the capacity of the installation, but, in addition, increases the quantity of pea berries that will not be stripped from their pods and will go to waste as the shell debris is returned to the field.

It is further highly desirable that the pea berries discharged from a shelling machine upon processing of the filled pods, with or without the vines, be free from chaff, shell fragments, dirt, and other impurities. Otherwise, additional process steps and separate machinery may be necessary to segregate the peas from foreign matter before they are ready for canning, which means additional cost and additional loss of time.

It is an object of the present invention to furnish an efficient pea-shelling machine which is capable of swiftly handling large quantities of peas in a continuous process.

Another object is to furnish a pea-shelling machine adapted to strip the pea berries from the pods without first separating the pods from the vines.

Another object is to provide a machine for shelling peas while the pods are still attached to the vines, wherein contamination of the peas by the juices of the vines is kept at a minimum.

Another object is to provide a pea-shelling machine which, though adapted to swiftly process large quantities of pods, is of a construction that will safeguard the peas against injury such as bruising, splitting, or crushing.

Another object is to provide a pea-podding machine which is adapted to separate the extracted peas from practically all contaminating matter such as hull debris, vine splinters, dirt, and the like.

Another object is to provide an efficient pea-shelling machine of the type characterized which combines large capacity with such compactness of construction as to lend itself readily to mobile use.

These and other objects of my invention will be apparent from the following description and drawings in which:

Fig. 4 is a fragmentary cross-sectional view of the machine illustrated in Fig. 2 taken along line 4—4 thereof.

Fig. 5 is a detail view showing mechanism to prevent accidental cutting of the pea berries.

Fig. 6 is a detail view illustrating the position which a pod-bearing vine will assume on the mechanism illustrated in Fig. 5.

Figs. 7, 8, 9, and 10 are fragmentary views, in perspective, of the pea-shelling mechanism proper, in four different phases of its operational cycle.

Fig. 11 is a fragmentary plan view of the lower part of the pea-shelling mechanism illustrated in Figs. 7-10.

Fig. 12 is an enlarged fragmentary section through the pea-shelling mechanism longitudinally of the machine.

Figure 1:
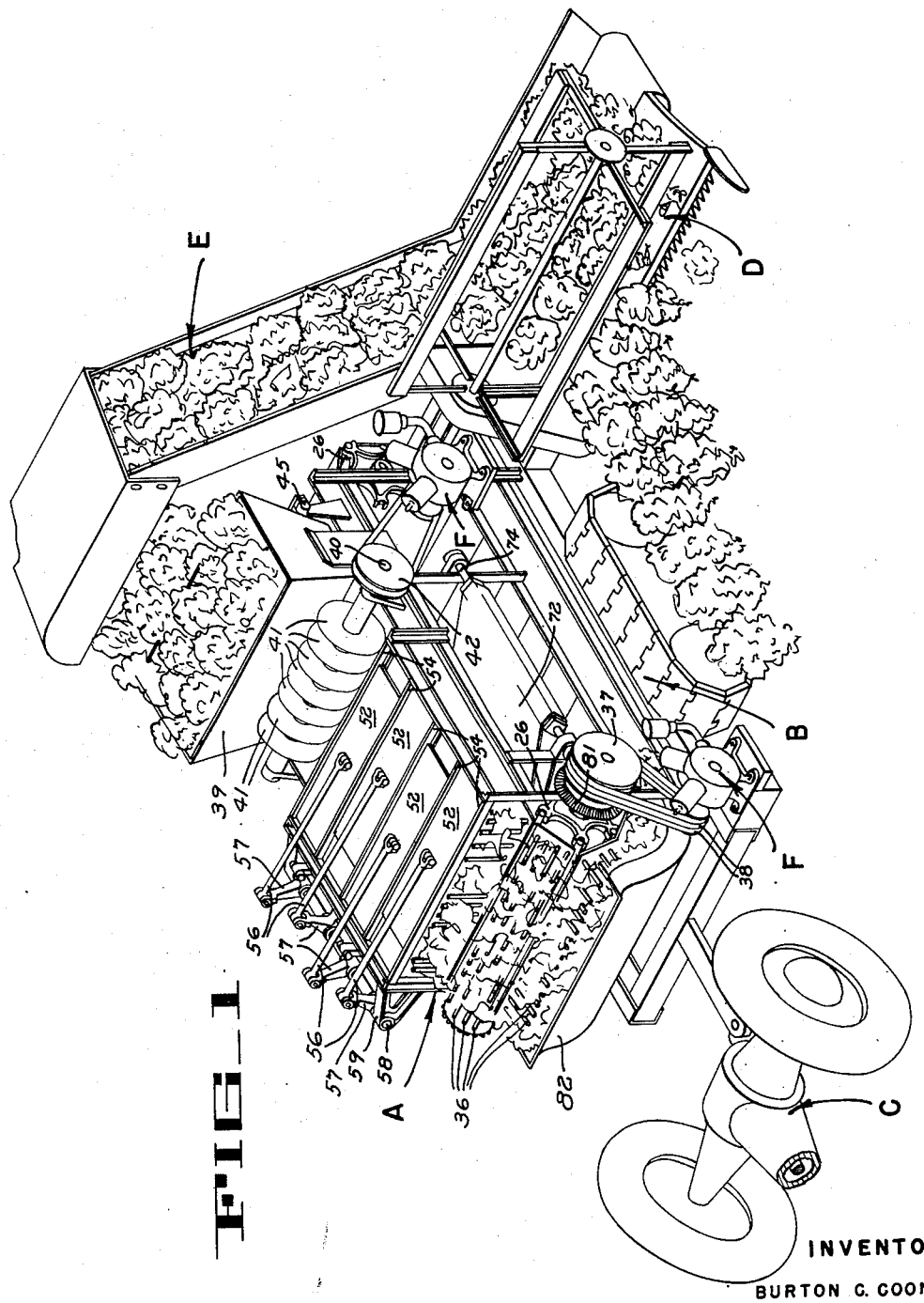
Fig. 1 is a perspective view of a mobile pea harvester embodying my invention.

The mobile pea harvester constructed in accordance with the present invention comprises a pea-shelling machine A mounted upon the platform of a wheeled carriage B which may be drawn by a tractor C. Arranged at one side of the machine A for movement with carriage B is a vine-cutting mechanism D from which the harvested vines with the pods attached thereto are delivered to the top of the machine A by an elevator E, as shown in Fig. 1.

Figure 2:
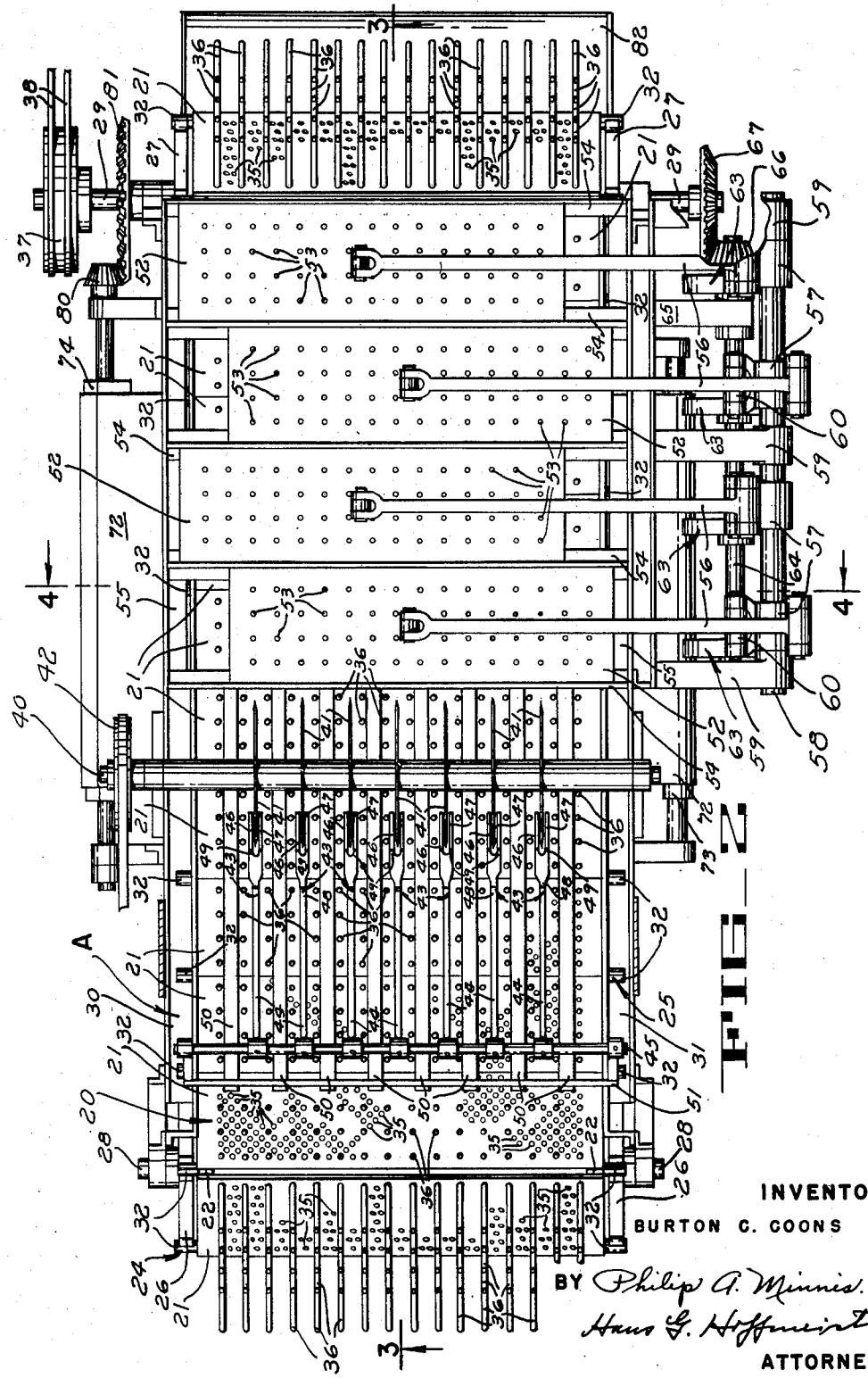
Fig. 2 is a plan view of a pea-shelling machine constructed in accordance with my invention, such as forms part of the harvesting machine illustrated in Fig. 1.
Figure 3:
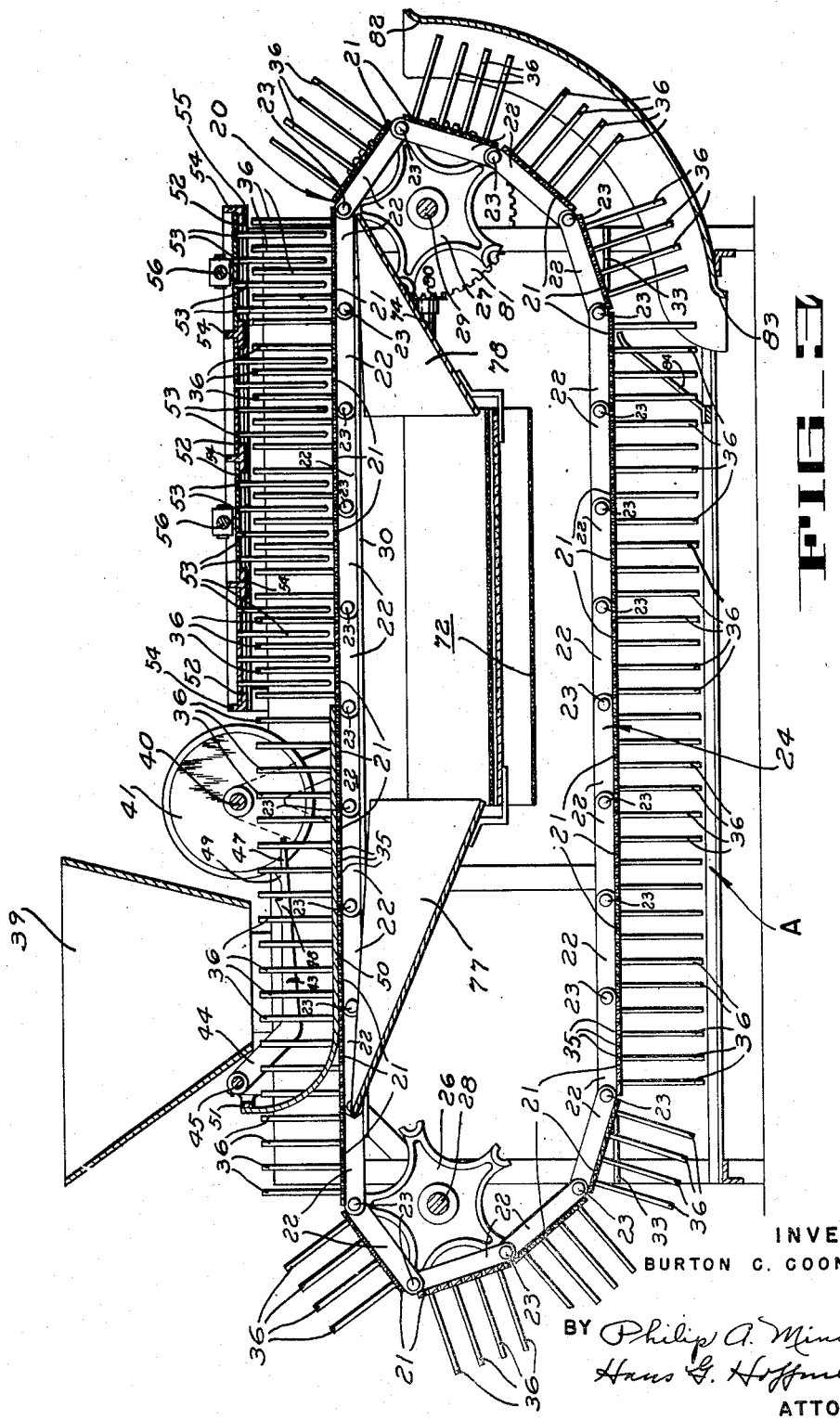
Fig. 3 is a fragmentary section of the machine illustrated in Fig. 2 taken along line 3—3 thereof.

Referring to Figs. 2 and 3, the pea-shelling machine A of my invention comprises an endless conveyor 20 composed of a plurality of hingedly connected rectangular sheets or plates 21 of metal, wood, hard rubber, or any other suitable material. In the preferred embodiment illustrated in the accompanying drawing the lateral edges of these sheets are each bolted or otherwise secured to a link 22 and the links of successive sheets are connected by pivots 23 to form two parallel chains 24 and 25. These chains are trained around pairs of star or skeleton wheels 26 and 27 arranged at the supply and the discharge end of the machine, respectively, and mounted for movement in unison upon transverse shafts 28 and 29 which are journaled in suitable bearings supported from the machine frame.

The endless conveyor 20 has an upper horizontal run which is maintained in proper position intermediate of the skeleton wheels 26 and 27 by a pair of longitudinally positioned angle bars 30 and 31 (Fig. 4) arranged at either side of the conveyor and rigidly supported from the machine frame. These angle bars possess inwardly directed horizontal flanges for supporting glide roller sleeves 32 arranged around the outwardly projecting ends of the pivots 23, as best shown in Fig. 4. The lower horizontal run of the endless conveyor 20 is similarly supported by another pair of longitudinally positioned angle bars 33 and 34 carried by the machine frame, as likewise shown in Fig. 4.

Each of the plates 21 of the conveyor 20 (Fig. 11) is provided with numerous perforations 35 of preferably circular contour which are of such diameter as to pass maximum size peas or whatever other legume for which the machine may be designed. The upper edges of these perforations should be rounded or beveled, as may be seen from Fig. 12, to avoid injury to the peas passing through said perforations. In addition, each conveyor plate 21 is provided with a number of outwardly projecting equi-spaced pins or studs 36 (Fig. 12) which are arranged in parallel longitudinal rows spaced equal distances apart in transverse direction, as illustrated in Figs. 7, 8, 9, 10 and 11.

In order that the conveyor 20 may be turned in clockwise direction (as viewed in Fig. 3), the transverse shaft 29, which carries the skeleton wheels 27 at the discharge end of the machine, is laterally extended to support a pulley 37 (Fig. 2) which is operatively connected by drive belts 38 with any suitable source of rotary power such as the engine F.

Disposed above the upper horizontal run of the conveyor 20, at the initial part thereof, is a feed hopper 39 of conventional design (Fig. 3) which is suitably supported from the machine frame in such a manner that its lower end is positioned somewhat above the level of the studs or pins 36. The previously mentioned supply elevator E is arranged to deliver the cut vines with the pods attached thereto from the vine-harvesting mechanism D into the feed opening of the hopper 39 (Fig. 1).

Closely behind the hopper 39 (Fig. 3) there extends across the upper horizontal run of the conveyor 20 a transverse shaft 40 the ends of which are journaled in bearings that are supported from the machine frame at either side of the conveyor, as shown in Figs. 3 and 4. The terms "ahead of" and "behind" and words of similar import as used in the present description and the following claims when referring to operative portions of the shelling mechanism shall be held to mean "with relation to the movement of the conveyor through the shelling or hulling zone" and not the direction of travel of the harvester through a field. Firmly mounted upon the shaft 40 are several circular knives 41 spaced equal distances apart and so positioned relative to the conveyor 20 and the projecting studs 36 thereof that the planes of their blades are parallel to the direction of movement of said conveyor with their cutting edges extending into spaces intermediate of adjacent longitudinal rows of said studs. To operate the knives 41, the shaft 40 is laterally extended, as shown in Fig. 2, and carries a pulley 42 which may be driven from the same or a separate source of power as the conveyor 20.

During operation of the pea-shelling machine of my invention, the circular knives 41 are turned at high speed to slice the pea vines, moved against them by the advance of the conveyor 20, into portions of such limited length as to preclude the formation of bunches of a size that might interfere with the operation of pea-shelling mechanism proper. To protect the peas from accidental injury, while the vines are being sliced to pieces by the action of the circular knives 41, the blades of these knives are provided with guards 43 (Figs. 5 and 6) of such construction as to cause the plump bodies of filled pods to slide laterally out of the range of the rotating cutting edges while freely permitting access to all vines of excessive length for effective reduction thereof.

For this purpose each knife 41 is associated with a cranked arm 44 (Fig. 2). All arms 44 are adjustably mounted upon a transverse rod 45 which is supported from the machine frame at a point in front of the hopper 39 and above the level of the conveyor pins 36. Each arm 44 is disposed between two adjacent rows of pins 36 in longitudinal alignment with its respective blade 41 and extends longitudinally across all of the horizontal width of the hopper 39 a certain distance below the discharge opening thereof (Fig. 3) to a point in front of the effective sector of its associated knife 41 where it forks into two parallel prongs 46 and 47 which embrace part of the peripheral area of the blade, as best shown in Fig. 5. As likewise shown in Fig. 5, the arm 44 and its prongs 46 and 47 have the shape of bars with their flat sides disposed vertically so that they present relatively narrow edges to the vines descending upon the conveyor 20 through the feed hopper 39. At points near its end, the narrow upper edge of each bar 44 is provided with a sequence of gently rising and abruptly descending humps 48 and 49 which may extend into the forked end portion of the arm, as shown in Fig. 5.

During operation when the harvested vines descend through the hopper 39 and settle upon the conveyor plates 21, filled pea pods, due to their roundness and due to their weight will, as a rule, slide off the narrow upper edges of the bars 44 and position themselves at either side thereof, as shown in Fig. 6. Thus, as the steady advance of the conveyor 20 presents the mass of vines and pods to the action of the slicing knives 41, the prongs 46 and 47 at the end of arms 44 will keep the pods safely away from the cutting edges while vines of sufficient length or vines connecting pods positioned at either side of the bars 44 cannot escape the cutting action of said knives. If it should happen, however, that a pod balances upon the upper edge of an arm 44 as it advances toward the zone of the rotating knives, the sudden drop of the pod from the peak of a hump is bound to disturb its balance causing it to drop to a position at one of the sides of the bar 44. While a single such hump will usually be sufficient to operate in the described manner, I prefer to provide a sequence of two or more such humps, as shown in Figs. 3 and 5, to still further minimize the possibility of accidental injury to the peas through the action of the slicing knives.

Since pea pods positioned in the manner illustrated in Fig. 6 will drop vertically upon the upper surface of the conveyor segments 21 when cut loose by the action of the rotating knives 41 and, if slender enough, may slip through the perforations 35 thereof, narrow strips 50 of sheet metal (Fig. 2) or any other suitable material are arranged between each two adjacent longitudinal rows of studs 36 below the level of the rotating knives to cover up these perforations for the time of their travel underneath knives 41 and thus prevent accidental escape of unprocessed pods. These strips 50 extend preferably from a point in front of the hopper 39 to a point rearwardly of the knives 41 and may be supported in any suitable manner, such as the one illustrated in Fig. 3, where their left ends are bent upwardly and are secured to a bridge 51 supported by the machine frame and extending transversely across the conveyor 20 above the level of pins 36.

To crack the pods entrained on the conveyor plates 21, four juxtapositioned rectangular plates 52 (Fig. 2) are arranged across the conveyor 20 directly behind the circular knives 41 for limited reciprocating movement in a direction transversely to the direction of movement of said conveyor. These plates 52 are similar in size and construction to the conveyor plates 21 but are devoid of perforations and are inverted, with their studs 53 projecting downwardly and are interposed between the studs 36 extending upwardly from the conveyor plates 21, as shown in Figs. 3 and 4. Like the studs 36 on the conveyor plates, the studs 53 on the reciprocating plates are spaced equal distances apart from one another and are aligned in transverse as well as longitudinal direction.

The long edges of the reciprocating plates 52 are slidably supported by tracks 54 disposed across the conveyor 20 above the level of the upwardly projecting conveyor studs 36. These tracks are of a greater length than the transverse dimensions of either plates 21 or plates 52, as may best be seen from Fig. 2, so as to provide sufficient space for the latter to shift relative to the former in transverse direction.

In the embodiment illustrated in the drawing the tracks 54 are formed by a number of L- or T-bars, respectively, depending on whether they accommodate an outer edge or two adjacent inner edges of the plates 52, and the ends of these bars rest upon the horizontal flanges of a pair of parallel angle bars 55 arranged at either side of the upper horizontal run of the conveyor 20 and rigidly supported from the machine frame, as shown in Fig. 4.

To reciprocate the studded plates 52 in the described manner, a connecting rod or pitman 56 is hinged to the center of each plate, as shown in Fig. 2. The opposite end of each of said pitman extends laterally beyond the conveyor arrangement and is pivotally connected to one arm of a bell crank lever 57 which is rotatably mounted upon a horizontally positioned shaft 58 (Fig. 4) rigidly supported from the machine frame by a number of brackets 59 (Figs. 2 and 4). The other arm of the bell crank lever 57 is pivoted to the upper end of a vertical link 60, the lower end of which carries a roller 61 that engages the cam way 62 of a box cam 63. This box cam is firmly mounted upon a horizontally positioned drive shaft 64 which is rotatably supported by a number of brackets 65 projecting laterally from the machine frame, as shown in Fig. 4.

A bevel gear 66 (Fig. 2) is keyed upon the shaft 64 near the discharge end of the machine and meshes with another bevel gear 67 keyed upon a laterally extended end of the previously mentioned transverse shaft 29 which drives the skeleton wheels 27 and which carries a pulley 37 that is operatively connected to a suitable source of rotary power, as previously pointed out.

Thus, when rotation of the transverse shaft 29 sets the conveyor 20 into motion, it will also turn the longitudinal shaft 64 and the box cams 63 which control the movement of the reciprocating plates.

As shown in Fig. 4, the cam way 62 of the box cams 63 rises gradually from its lowest point 68 to a solitary peak 69 diametrically opposite thereof, and then returns to said lowest point 68 in a symmetrical pattern. As likewise shown in Fig. 4, the roller 61 at the bottom end of the link 60 engages the cam way 62 at a point vertically below the drive shaft 64 for which reason the link 60 is vertically slotted, as shown at 70, to accommodate said shaft.

As a box cam 63 is turned in counterclockwise direction as viewed in Fig. 4 by movement of the conveyor drive shaft 29, the roller 61 at the bottom of link 60 climbs gradually to the peak 69 of the cam way 62. As a result thereof, the link 60, being confined to substantially linear movement in vertical direction due to shaft 64 engaging its vertical slot 70, moves downwardly and turns the bell crank lever 57 in clockwise direction. This in turn causes the pitman 56 to slide its associated plate 52 to the right, across the conveyor 20, to an extent determined by the relative lengths of the arms of bell crank lever 57.

As the box cam 63 continues its rotary movement, the roller 61 descends gradually from the peak 69 of the cam way 62 and pushes link 60 upwardly, which turns the bell crank lever in a counterclockwise direction (as viewed in Fig. 4) causing the pitman 56 to return its associated plate 52 to its original position.

The pins or studs 36 of the conveyor and those 53 of the reciprocating plates are arranged in spaced apart patterns, so that when relatively interposed, as the conveyor advances, and as the plates 52 are reciprocated back and forth, the pins 53 of the reciprocating plates will move along zig-zag paths through the conveyor pins without striking them. In this manner, the conveyor pins draw the chopped up vines along through the shelling zone while the plate pins alternately approach, cross over past, and recede from the advancing conveyor pins. This action cracks open the pods and rolls out the peas, but has very little crushing action on the vines or the peas themselves.

Figs. 7, 8, 9 and 10 illustrate the relative positions of the two interjacent sets of studs 36 and 53 at four different stages during one cycle of operation of the reciprocating plates 52, during an advance of the conveyor. The studs 36 of the conveyor plates are cut short and the showing of the studs 53 of the reciprocating plates restricted to one transverse row so as to clearly show the path of the latter relative to the former.

Fig. 7 represents an initial position in which the studs 53 of the reciprocating plate 52 are longitudinally aligned with the studs 36 of the conveyor plates 21, with each stud 53 being positioned halfway between two longitudinally adjacent studs 36. Fig. 8 illustrates a somewhat later stage in which the reciprocating plate 52 has moved to the left, as indicated by arrow $l$, over a distance equal to the interval between adjacent longitudinal rows of the conveyor studs, while the conveyor plates have advanced in the direction of arrow $f$ over a distance corresponding to the interval between two of their longitudinally consecutive studs. These movements place the studs 53 again into alignment with longitudinally adjacent studs 36 of the conveyor plates 21, with the difference, however, that they are now stationed one longitudinal row to the left and one transverse row to the rear of their original positions.

Fig. 9 illustrates the extreme left position of the reciprocating studs 53 at the moment when the plate 52 is about to reverse its direction and move to the right, as indicated by arrow $r$. It shows that the studs 53 have reached a position intermediate of adjacent longitudinal rows of the conveyor studs 36 while the latter have advanced a distance corresponding to half their longitudinal interval so that the reciprocating studs 53 are now aligned with a transverse row of the conveyor studs 36.

In Fig. 10 the reciprocating studs 53 have reached their extreme right position in which they are again in alignment with a transverse row of the conveyor studs 36 but are now two longitudinal rows to the rear of the extreme left position illustrated in Fig. 9. As the machine continues to operate, a new cycle of identical character is initiated and will be followed by other such cycles as long as the machine remains in operation.

In Figs. 7–10 the path described by the rightmost one of the studs 53 has been marked in its successive stages of progress and indicates that the reciprocating studs 53 move through the forest of the advancing conveyor studs 36 in sinuous or zig-zag paths without at any time interfering with the steady advance of the latter. In their relative movement the distances between the two sets of studs 36 and 53 vary from a maximum of about half the interval between studs 36 (less half the thickness of a stud 53) to a minimum which is reached as a stud 53 passes just ahead of an advancing stud 36, and to the right or the left thereof, as the case may be.

The maximum distance, which the studs 36 and 53 assume relative to one another during operation of the machine, should be chosen sufficiently wide to prevent excessive accumulation of the vines in front of the first reciprocating plate 52 and the minimum distance, which studs 36 and 53 assume, should preferably be such that it will just pass the maximum-sized peas without injuring them. When properly dimensioned in this respect, the machine of the present invention will swiftly process large quantities of vines, and will bend, crack and squeeze the pea pods between the rounded surfaces of the studs 36 and 53 in such a manner as to cause practically all of the pea berries to drop, or be driven, from their shells, without bruising, crushing, or otherwise injuring their delicate structures.

Moreover, appropriate predetermination of the minimum distance, which the studs 36 and 53 assume relative to one another during operation of the mechanism, in combination with the reduction in length of the vines as secured by the action of the previously described slicing knives 41, prevents excessive squeezing and rupturing of the pea vines and thus minimizes exudation of vine juices that might contaminate the peas and impair their taste.

To establish the favorable operating conditions described above, the thickness of the studs 36 and 53 and the transverse as well as longitudinal spaces between the studs on both plates 21 and 52 require careful dimensioning, and also the relative movements of the plates must be exactingly timed by appropriately proportioning the bevel gears 66 and 67 on cam shaft 64 and conveyor drive shaft 29, respectively, and by properly dimensioning the box cam 63 and the arms of bell crank lever 57.

Furthermore, to prevent the peas from being crushed, or otherwise injured, underneath the ends of the reciprocating studs 53, these studs should be of such vertical length that the space between their ends and the plates 21 is too small to admit any pea berries, and the edges of their ends should be rounded as shown in Fig. 12. In this manner, the ends of the studs 53 will be effective to tear open pods lying directly on the conveyor plates 21 but will be unable to injure the peas which they will merely push around until they escape through one of the perforations 35. Even the upper edges of these perforations should be rounded off or beveled, as shown in Fig. 12 and as has previously been described, to avoid accidental injury to the peas as they are moved over the plates 21 and into said perforations 35 by the reciprocating motion of the studs 53.

To permit adaptation of the mechanism to different crop conditions the position of the studs 53 may be vertically adjustable, as shown in Fig.

12 wherein the upper threaded ends of the studs 53 engage threaded openings in the reciprocating plate 52 and are held in adjusted position by suitable lock nut 53a.

The effectiveness of the described pea-shelling mechanism may be materially enhanced by arranging adjacent ones of plates 52 to operate out of phase relative to one another, such as illustrated in Fig. 2 where the first and third plates are at their extreme positions to the right of the conveyor line while the second and fourth plates are at their extreme left positions as viewed from the direction of movement of the conveyor. It will be understood that this or any other phase relation between the reciprocating plates 52 may easily be established by mounting the box cams 63 at angularly displaced positions relative to one another upon their common operating shaft 64.

As the action of the reciprocating studs 53 cracks the pea pods entrained upon the conveyor plates 21, the peas released from their shells drop through the perforations 35 upon the inclined upper surface of an endless apron 72 of canvas, rubber, or other suitable material. This apron is trained around a lower and an upper roller 73 and 74, respectively, journaled in lateral projections of the machine frame at either side of the conveyor 20, as shown in Figs. 2 and 4. The upper run of the apron 72 may be supported by an inclined metal plate 76, as shown in Fig. 4, and slanting slide surfaces 77 and 78 may be provided at either flank of apron 72 to safely conduct all peas falling through the apertures of the conveyor plates 21 onto the inclined upper face of said apron.

To separate the peas from any small debris or dirt that may have fallen through the perforations 35, the endless apron 72 is only moderately inclined and is slowly turned in such a manner that its upper run travels uphill. At the same time, however, the apron is subjected to a jigging or vibratory motion which causes the rounded pea berries to roll down the gently inclined slope formed by its upper run, against the upward movement thereof, and drop into a chute 79 and subsequently into a container 79a which may be carried by a platform secured to the machine frame (Fig. 4). The light and flat-surfaced debris, however, will be carried uphill by the movement of the apron and will be dumped onto the field as the endless apron returns around its upper roller 74.

To secure the described performance of the endless apron 72, its rollers may be of a polygonal, or preferably square, cross section. Mounted upon one end of the upper roller 74 is a bevel gear 80 which meshes with another bevel gear 81 keyed upon the repeatedly mentioned drive shaft 29 of the conveyor 20, so that the apron may be actuated from the common source of rotary power.

The rear end of the machine of the present invention may be provided with an arcuate guard or fender 82 which is held in position by the machine frame. At a suitable point near the bottom of the machine this guard or fender 82 terminates into a discharge lip 83, as shown in Fig. 3, over which the processed vines and the empty pods are restored to the ground as the machine travels over the field.

A number of suitable separator prongs or fingers 84 may be arranged at either side, and intermediately of, the rows of studs 36 at suitable points behind the discharge lip 83, as shown in Fig. 3, to disengage the processed vines from the studs 36 and make sure that the conveyor plates 21 are cleared from all debris by the time they move again underneath the hopper 39 to receive a new supply of freshly gathered vines.

From the foregoing description of the construction and operation of the present invention, it will be apparent that the machine is capable of handling large quantities of peas in a continuous process. It will shell the peas whether the pods have been detached from the vines or are still attached thereto. In consequence thereof, the machine may be combined with a mobile vine-cutting mechanism and move across the fields to process the vines as they are cut and gathered, and will then return the processed vines and the empty pods to the ground.

In view of the provision of the circular knives, the machine is capable of handling long vines without any danger of entanglement which might overload the machine. Due to the rounded surfaces of the cooperating studs and due to their relative movement within predetermined limits, a very gentle handling of the peas is assured and damage to the peas is, therefore, greatly reduced. Furthermore, the described relative movement of the studs and the aptitude of the reciprocating plates for ganging into a series of consecutive units, assures release of practically all of the peas and reduces waste, due to part of the peas being discarded with the processed hulls, to a minimum. The same constructional peculiarities of the machine are responsible for the fact that the vines are not subjected to excessive pressure and, hence, contamination of the peas by the juice of the vines is negligibly small.

While I have explained the present invention with the aid of a specific example, it will be understood that I do not wish to be limited to the constructional details shown and described which may be departed from without departing from the scope and spirit of my invention. Thus, the number and the spacing of the studs on the cooperating plates may be varied to increase the handling capacity of the machine and/or adapt the machine to a particular type of legume. Also, the extent of transverse travel of the reciprocating plates may be increased or decreased, if desired, and the machine may be provided with more or less such plates than the number actually shown. Furthermore, while I have described my invention as part of a mobile harvester, it will be understood that the machine constructed in accordance with my invention may be employed as a portable unit which may be set up at some centrally located place and to which the gathered vines may be carted from the surrounding fields for processing.

Having thus described my invention, what I claim as new and desire to protect by Letters Patent is:

1. Arrangement for shelling unvined legumes comprising a conveyor line having a horizontal run, means for advancing said conveyor line, a plurality of longitudinal rows of first studs projecting upwardly from said line, means for delivering said unvined legumes onto said conveyor line at an initial portion of said horizontal run, means for reducing the length of the vines of said legumes at a subsequent portion of said horizontal run including a plurality of rotary knives disposed intermediately of adjacent rows of said first studs, a number of plates disposed parallel to and above a final portion of said horizontal run, each of said plates having a plurality of second studs projecting downwardly therefrom to be interposed between said first studs, and means for reciprocating said plates across said horizontal run in timed relation with an advance of said conveyor line.

2. Arrangement for shelling unvined legumes comprising a conveyor line having a horizontal run, a plurality of longitudinal rows of first studs projecting upwardly from said line, means for operating said line in a predetermined direction, means for delivering said unvined legumes onto said conveyor line at an initial portion of said horizontal run, means for reducing the length of the vines of said legumes at a subsequent portion of said horizontal run and including a plurality of rotary knives disposed intermediately of adjacent ones of said longitudinal rows of studs, means for protecting the pods of said legumes from said knives while exposing said vines to the action thereof comprising a fork arranged in front of each of said knives with its prongs disposed at either side thereof and having an elongated arm in longitudinal alignment with said respective knife, said arm being of the shape of a flat bar with its flat faces extending in vertical planes, a number of plates disposed parallel to and above a final portion of said horizontal run, each of said plates having a plurality of second studs projecting downwardly therefrom into interjacent relation with said first studs, and means for reciprocating said plates and second studs across said horizontal run and first studs in timed relation with the operation of said conveyor line.

3. Arrangement according to claim 2 wherein the upper edge of said long-armed fork is provided with a number of humps rising gently and descending abruptly in the direction of movement of said conveyor line.

4. In a machine for harvesting legumes while attached to the vines upon which they have grown, a conveyor provided with a first plurality of rows of studs, movable along parallel paths through a shelling zone of said machine, for advancing vines and legumes through said zone, a second plurality of rows of studs mounted above and extending into the paths of the first rows of studs, and means for reciprocating said second plurality of studs intermeshing across the paths of movement of said first plurality of studs in timed relation to the movement thereof so that the studs of said second plurality pass the studs of the first plurality alternately in opposite direction, and in spaced relation thereto.

5. In a machine for harvesting legumes while attached to the vines upon which they have grown, a conveyor provided with a first plurality of rows of studs, movable along parallel paths through a shelling zone of said machine for advancing vines and legumes through said zone, a second plurality of rows of studs mounted above and extending into the paths of the first rows of studs, means for reciprocating said second plurality of studs intermeshing across the paths of movement of said first plurality of studs in timed relation to the movement thereof so that the studs of said second plurality pass the studs of the first plurality alternately in opposite direction and in spaced relation thereto, and means for severing the vines into short lengths before they are moved into the shelling zone.

6. Arrangement for shelling unvined legume pods comprising a traveling conveyor member, a plurality of longitudinal rows of upwardly projecting studs mounted on said conveyor member, said conveyor member having a plurality of perforations therethrough intermediate of said rows, means for delivering said unvined legume pods onto said conveyor member at an initial portion thereof, means provided at a subsequent portion of said conveyor for reducing the length of the vines of said legumes and including a plurality of rotary knives each disposed intermediate of adjacent ones of said longitudinal rows of studs, a plurality of plates disposed parallel to and above a following portion of said conveyor member, a plurality of downwardly projecting studs mounted on each of said plates and projecting between said first mentioned studs, means for reciprocating said plates and downwardly projecting studs transversely to and in timed relation with the advance of said conveyor member, and means mounted to close a plurality of said perforations to prevent accidental escape of said legume pods through said perforations during a limited distance of travel approaching and under the knives in the region below said knives.

7. In a machine for shelling legumes, an open bottom hopper for receiving legume vines, a plurality of narrow bars across the open bottom of said hopper, a plurality of knives aligned with said bars laterally of the open bottom of said hopper, a plurality of conveyor studs mounted to pass the open bottom of said hopper in a direction longitudinally of and between said bars towards said knives, power drive means mounted to advance said conveyor studs beyond the open hopper bottom and past the knives to draw vines from the hopper along the bars and into the knives for slicing the vines into short lengths, a plurality of laterally movable studs mounted in the paths of the conveyor studs at points beyond said knives in the direction of movement of said conveyor studs, and means for moving the laterally movable studs transversely of and in timed relation to the advance of the conveyor studs alternately to approach and recede from the conveyor studs to crack open legume pods therebetween and to remove the legumes from the opened pods.

BURTON C. COONS.

REFERENCES CITED

The following references are of record in the file of this patent:

UNITED STATES PATENTS

| Number | Name | Date |
|---|---|---|
| 288,743 | Swingle | Nov. 20, 1883 |
| 456,730 | Lorimer | July 28, 1891 |
| 693,926 | Thomas | Feb. 25, 1902 |
| 815,711 | Johnson | Mar. 20, 1906 |
| 906,318 | Smith | Dec. 8, 1908 |
| 1,117,904 | Pritchard | Nov. 17, 1914 |
| 1,257,592 | Ek | Feb. 26, 1918 |
| 1,265,846 | Weymer | May 14, 1918 |
| 1,426,498 | Owen | Aug. 22, 1922 |
| 1,486,918 | Plummer | Mar. 18, 1924 |
| 1,513,834 | Loftness | Nov. 24, 1924 |
| 2,037,300 | Arbuckle | Apr. 4, 1936 |
| 2,275,950 | Hamachek, Jr. | Mar. 10, 1942 |
| 2,333,576 | Kerr | Nov. 2, 1943 |

FOREIGN PATENTS

| Number | Country | Date |
|---|---|---|
| 55,759 | Austria | Oct. 10, 1912 |
| 564,162 | Germany | Nov. 14, 1932 |